US008813740B2

(12) United States Patent
Linton

(10) Patent No.: US 8,813,740 B2
(45) Date of Patent: Aug. 26, 2014

(54) OVEN ACCESSORY WITH REMOVABLE INSERTS

(75) Inventor: Joshua Linton, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 283 days.

(21) Appl. No.: 13/368,496

(22) Filed: Feb. 8, 2012

(65) Prior Publication Data

US 2013/0118473 A1   May 16, 2013

(51) Int. Cl.
*F24C 15/16* (2006.01)
(52) U.S. Cl.
USPC ....... 126/337 R; 126/332; 126/333; 126/505; 99/446; 99/448; 211/181.1
(58) Field of Classification Search
CPC ..... A21B 3/155; A23L 1/0128; A47J 36/027; A47J 36/16; A47J 36/22; A47J 37/0694; A47J 37/0786; A47J 39/02; A47L 19/04
USPC ........ 126/332, 333, 337 R, 505; 99/415, 446, 99/448; 211/181.1
See application file for complete search history.

(56) References Cited

U.S. PATENT DOCUMENTS

| | | | | |
|---|---|---|---|---|
| 59,814 | A | * | 11/1866 | Bowman ........................ 126/333 |
| 714,537 | A | * | 11/1902 | Wallace ..................... 126/337 R |
| 898,828 | A | * | 9/1908 | Brown ........................... 126/333 |
| 1,128,485 | A | * | 2/1915 | Moor ............................ 126/332 |
| 1,341,717 | A | | 6/1920 | Lynch |
| 1,463,124 | A | * | 7/1923 | McConnell .................... 220/491 |
| 1,923,131 | A | * | 8/1933 | Wilkinson ..................... 126/9 R |
| 2,205,064 | A | | 6/1940 | Irwin |
| 2,934,210 | A | * | 4/1960 | Jordan ........................ 211/41.11 |
| 3,172,538 | A | * | 3/1965 | Fowler .......................... 211/49.1 |
| 3,199,438 | A | * | 8/1965 | Myler et al. ................. 99/421 R |
| 3,599,558 | A | * | 8/1971 | Goldberg ......................... 99/339 |
| 3,691,937 | A | * | 9/1972 | Meek et al. ..................... 99/340 |

(Continued)

FOREIGN PATENT DOCUMENTS

| | | |
|---|---|---|
| GB | 572117 A | 9/1945 |
| JP | 61111676 A   * | 5/1986 |

OTHER PUBLICATIONS

International Search Report and Written Opinion of PCT/US2012/064637 mailed Feb. 15, 2013.

(Continued)

*Primary Examiner* — Jorge Pereiro
(74) *Attorney, Agent, or Firm* — Nelson Mullins Riley & Scarborough LLP

(57) ABSTRACT

An oven accessory may include a frame structure formed of a material that is substantially invisible to RF energy and a plurality of removable inserts. The frame structure may include legs and a periphery supported by the legs to be elevated above a base disposed within an oven. The periphery may define a receiving opening and lie in a first plane that is spaced apart from and substantially parallel to a second plane in which the base lies. At least some of the removable inserts may be configured to be interchangeably disposed at the receiving opening independently of each other. At least one of the removable inserts may be configured to define at least one elevated food holding location to combine with at least one other food holding location to enable support of a food product in a substantially vertical orientation.

20 Claims, 13 Drawing Sheets

(56) References Cited

U.S. PATENT DOCUMENTS

| | | | |
|---|---|---|---|
| 3,962,961 A | 6/1976 | Peters | |
| 4,074,102 A | 2/1978 | Asen | |
| 4,191,160 A * | 3/1980 | Elliott | 126/9 R |
| 4,427,706 A * | 1/1984 | El-Hag | 426/243 |
| 4,526,158 A * | 7/1985 | Lee | 126/9 R |
| 4,593,171 A * | 6/1986 | Colato | 219/755 |
| 4,621,608 A * | 11/1986 | Lee | 126/9 R |
| 4,942,862 A | 7/1990 | Alden et al. | |
| 4,974,502 A | 12/1990 | Murdock | |
| 5,168,140 A | 12/1992 | Welker | |
| 5,174,196 A | 12/1992 | Cheatham | |
| D364,288 S * | 11/1995 | Kramer et al. | D6/465 |
| 5,638,809 A * | 6/1997 | Wienhold | 126/337 R |
| 5,823,100 A * | 10/1998 | Wienhold et al. | 99/449 |
| 5,860,358 A * | 1/1999 | Shriver | 99/426 |
| 6,029,566 A * | 2/2000 | McLemore | 99/400 |
| 6,135,014 A * | 10/2000 | Chang | 99/339 |
| 6,165,526 A * | 12/2000 | Newman | 426/248 |
| D444,012 S * | 6/2001 | Ferrer Beltran | D6/536 |
| 6,289,795 B1 * | 9/2001 | McLemore et al. | 99/400 |
| 6,323,471 B1 | 11/2001 | Yagi | |
| 6,626,090 B2 * | 9/2003 | McLemore et al. | 99/340 |
| 6,640,695 B2 * | 11/2003 | Stark | 99/447 |
| 6,742,446 B2 * | 6/2004 | McLemore et al. | 99/421 V |
| 6,899,019 B2 | 5/2005 | Han et al. | |
| D509,405 S * | 9/2005 | Shin | D7/409 |
| D509,706 S * | 9/2005 | Shin | D7/409 |
| 7,015,443 B2 | 3/2006 | Whipple, Jr. | |
| D532,654 S * | 11/2006 | Raichlen et al. | D7/409 |
| D538,106 S * | 3/2007 | Julian | D7/409 |
| D542,092 S * | 5/2007 | Raichlen et al. | D7/409 |
| 7,219,663 B2 * | 5/2007 | Cuomo | 126/25 R |
| 7,576,302 B2 * | 8/2009 | Kim | 219/392 |
| 7,667,168 B2 * | 2/2010 | Smith | 219/732 |
| 7,669,523 B1 * | 3/2010 | Zemel et al. | 99/426 |
| 7,770,751 B2 * | 8/2010 | Henry et al. | 220/529 |
| 7,942,278 B2 * | 5/2011 | Martin et al. | 211/125 |
| 7,967,155 B2 * | 6/2011 | Klingspor et al. | 211/153 |
| 8,418,604 B1 * | 4/2013 | Zemel et al. | 99/421 V |
| 8,499,944 B2 * | 8/2013 | Parks et al. | 211/153 |
| 2001/0035408 A1 * | 11/2001 | Adams | 219/734 |
| 2003/0145740 A1 * | 8/2003 | Stark | 99/447 |
| 2005/0039612 A1 * | 2/2005 | Denny | 99/450 |
| 2005/0204933 A1 * | 9/2005 | Freese et al. | 99/450 |
| 2006/0196492 A1 * | 9/2006 | Whitmer | 126/25 R |
| 2006/0225725 A1 * | 10/2006 | Rinaldo | 126/9 R |
| 2007/0131668 A1 * | 6/2007 | Kim | 219/392 |
| 2007/0137501 A1 * | 6/2007 | Manuel | 99/450 |
| 2007/0163449 A1 * | 7/2007 | Hart | 99/426 |
| 2008/0047915 A1 * | 2/2008 | Parks et al. | 211/153 |
| 2008/0047916 A1 * | 2/2008 | Klingspor et al. | 211/153 |
| 2008/0173186 A1 * | 7/2008 | Roake | 99/385 |
| 2009/0020491 A1 * | 1/2009 | Foster | 211/181.1 |
| 2009/0229477 A1 * | 9/2009 | Sarnoff | 99/450 |
| 2010/0043650 A1 * | 2/2010 | Yates et al. | 99/446 |
| 2010/0178396 A1 | 7/2010 | Lafferty et al. | |
| 2011/0017687 A1 * | 1/2011 | Martin et al. | 211/85.4 |
| 2012/0048123 A1 * | 3/2012 | Blackburn | 99/413 |

OTHER PUBLICATIONS

International Search Report and Written Opinion of PCT/US2012/064656 mailed Feb. 8, 2013.

Office Action from co-pending U.S. Appl. No. 13/368,566, mailed Nov. 20, 2012, 9 pages.

* cited by examiner

OVEN ACCESSORY WITH REMOVABLE INSERTS

CROSS REFERENCE TO RELATED APPLICATIONS

This application claims the benefit of U.S. Provisional Application No. 61/560,463, filed Nov. 16, 2011 and U.S. Provisional Application No. 61/560,505, filed Nov. 16, 2011, the contents of each of which are incorporated herein in their entirety.

TECHNICAL FIELD

Example embodiments generally relate to ovens and, more particularly, relate to provision of cookware appliances for an oven that is enabled to cook using radio frequency (RF).

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

Recently, ovens employing RF cooking as at least one mechanism by which a combination oven may cook food product have been developed. However, these ovens also have unique characteristics by virtue of the features made available in connection with the application of the heat sources involved. Cooking sequences must be organized in light of the expected results associated with each energy source that is to be employed. That said, factors such as air speed, time, temperature, and sequencing may not be the only factors that impact cooking characteristics. In this regard, internal characteristics of the oven structure may also impact the cooking characteristics.

BRIEF SUMMARY OF SOME EXAMPLES

Some example embodiments may provide an oven that employs multiple cooking sources, or at least an RF energy source. Some example embodiments may further provide for the addition of cookware appliances that may be placed within the cooking chamber of the oven to provide a user with greater flexibility and versatility with respect to positioning food items for RF cooking to achieve consistently heated and browned final products. In this regard, some example embodiments may provide an elevated baking rack where a double row elevated structure is provided.

In an example embodiment, an oven accessory is provided. The oven accessory may include a frame structure formed of a material that is substantially invisible to RF energy and a plurality of removable inserts. The frame structure may include legs and a periphery supported by the legs to be elevated above a base disposed within an oven. The periphery may define a receiving opening and lie in a first plane that is spaced apart from and substantially parallel to a second plane in which the base lies. At least some of the removable inserts may be configured to be interchangeably disposed at the receiving opening independently of each other. At least one of the removable inserts may be configured to define at least one elevated food holding location to combine with at least one other food holding location to enable support of a food product in a substantially vertical orientation.

Some example embodiments may improve the cooking performance and/or improve the operator convenience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
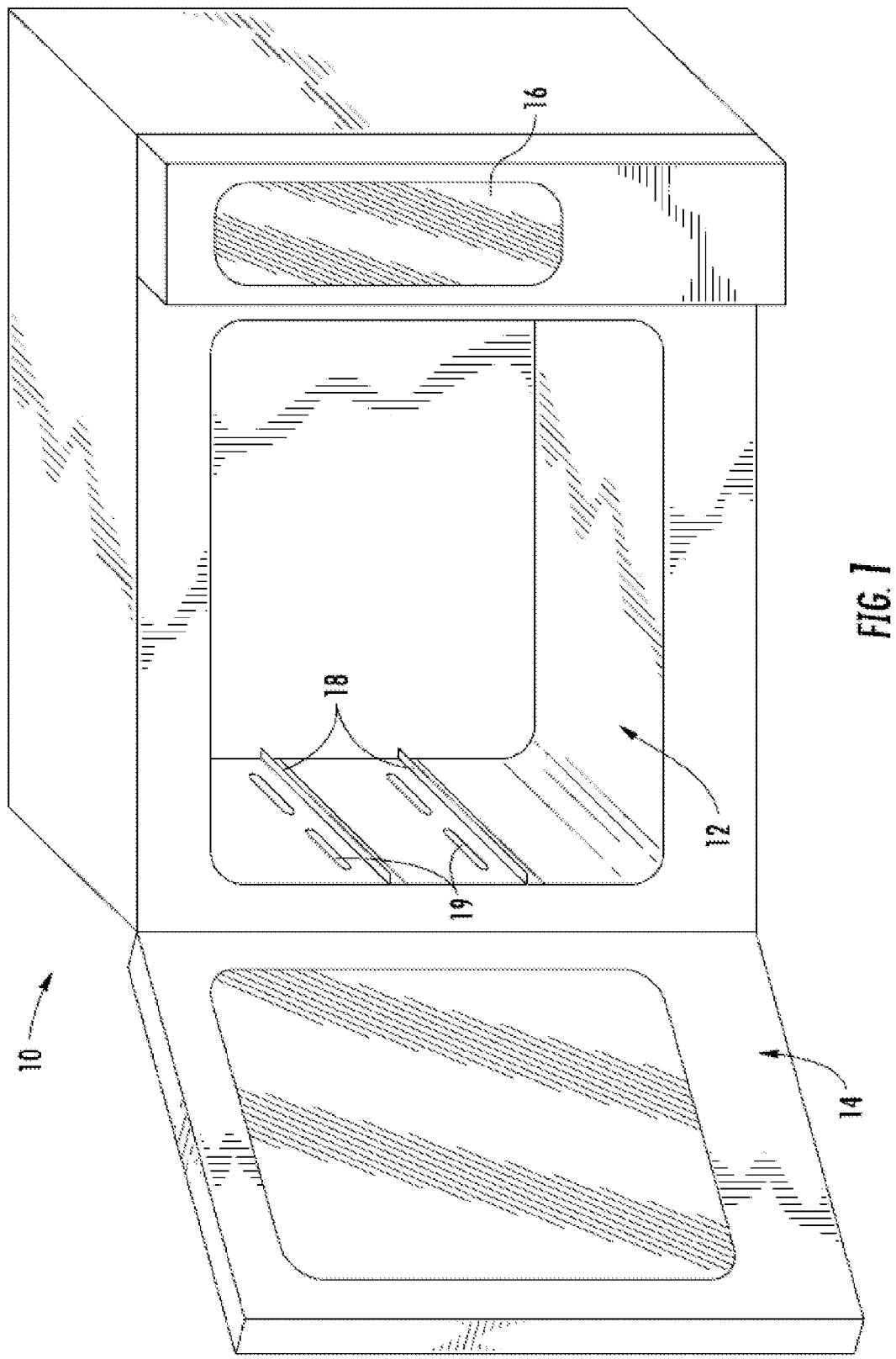
FIG. 1 illustrates a perspective view of an oven capable of employing at least two energy sources according to an example embodiment.
Figure 7A:
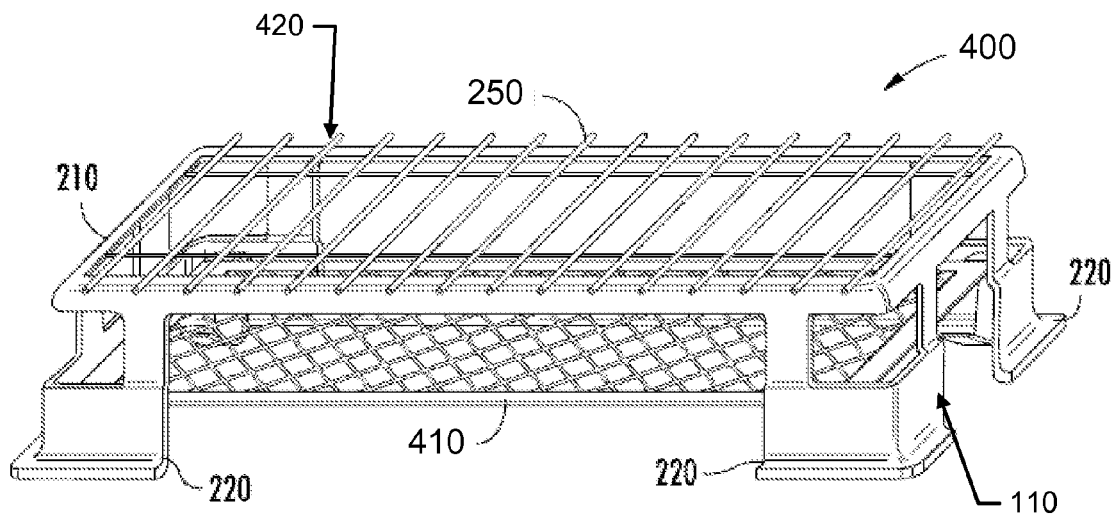
Figure 7B:
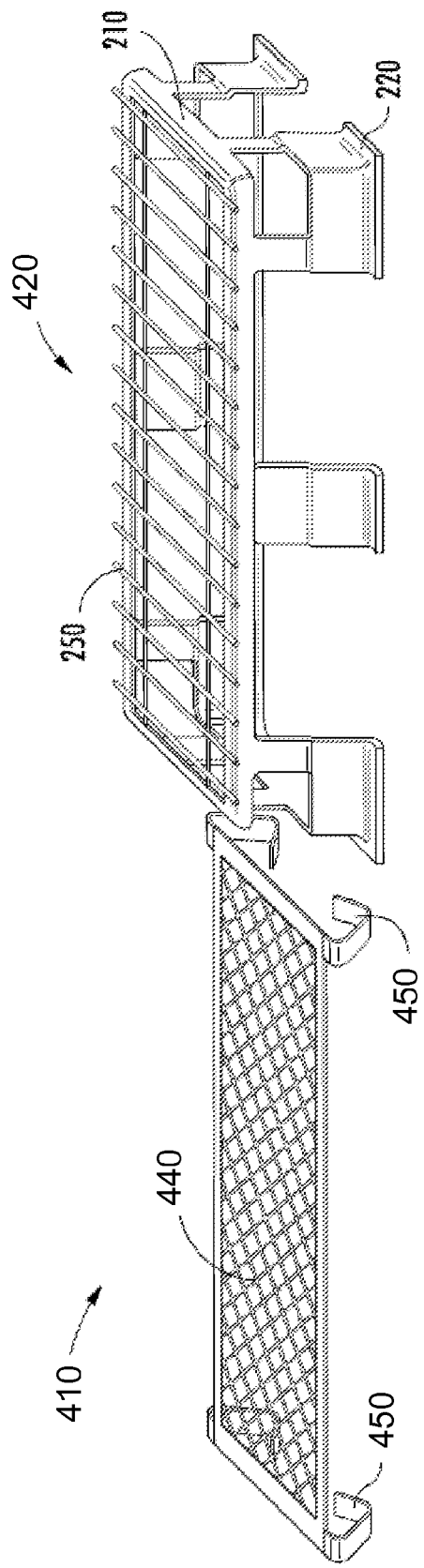
Figure 8:
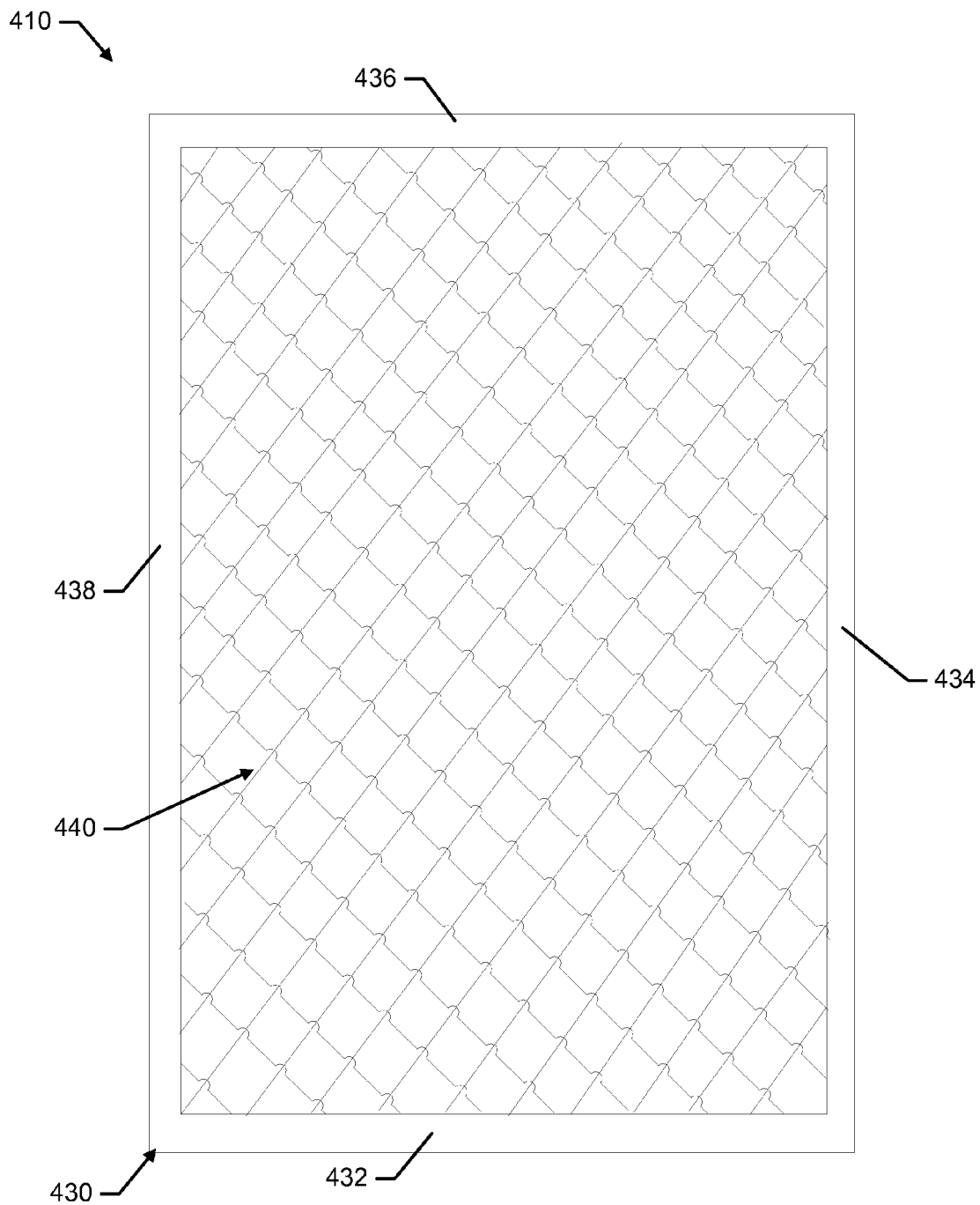
Figure 9:
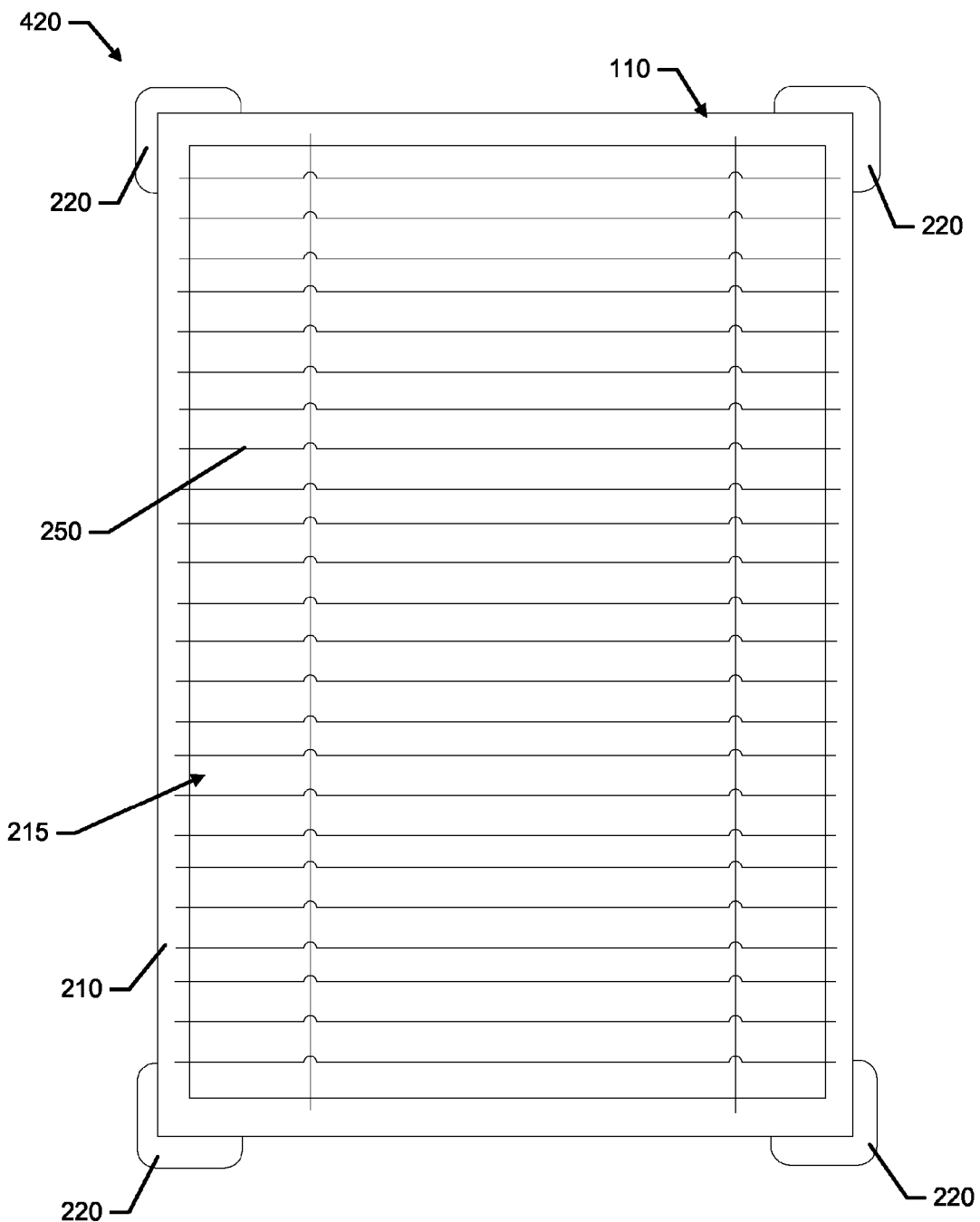
Figure 10:
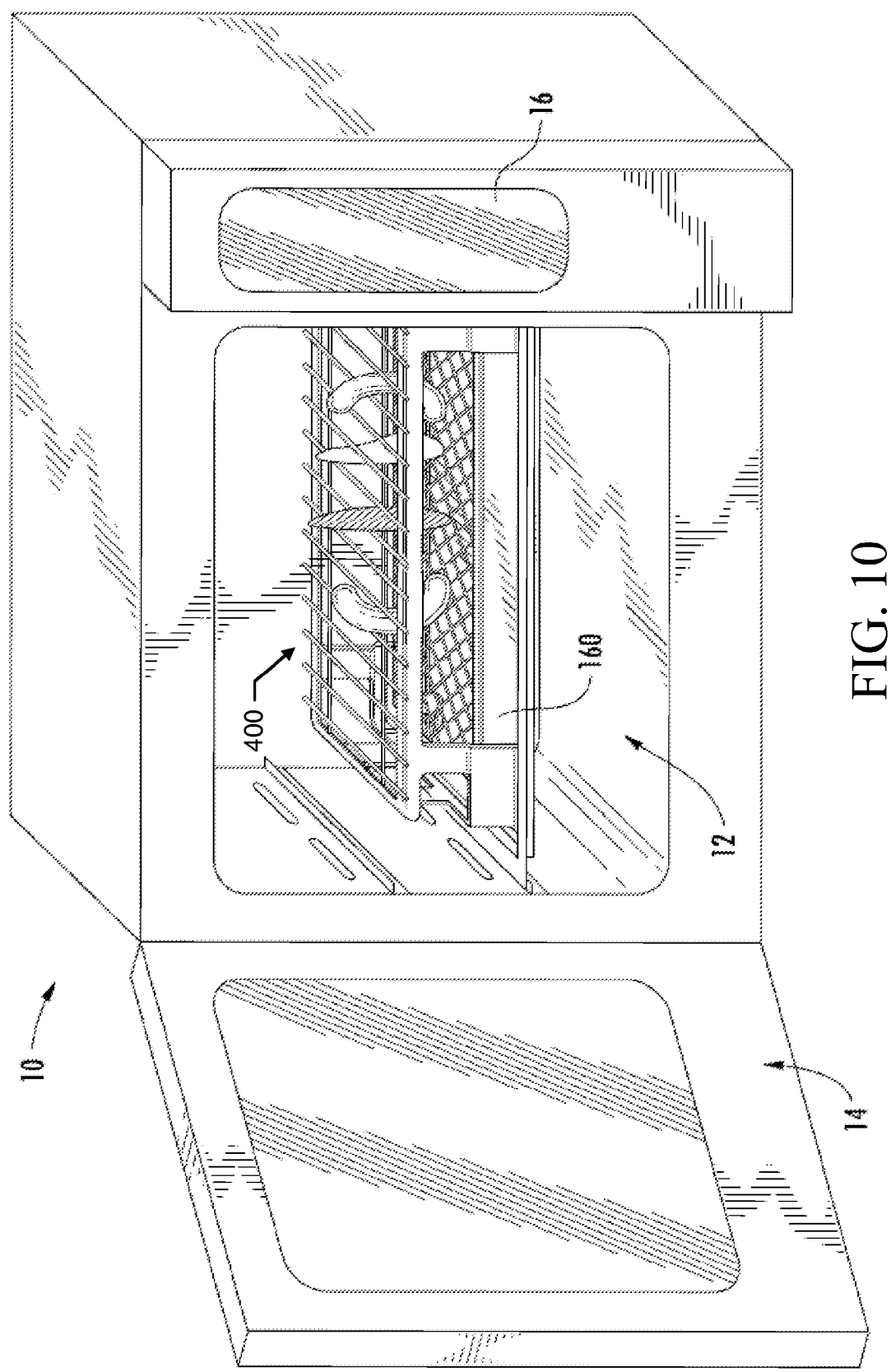
Figure 11:
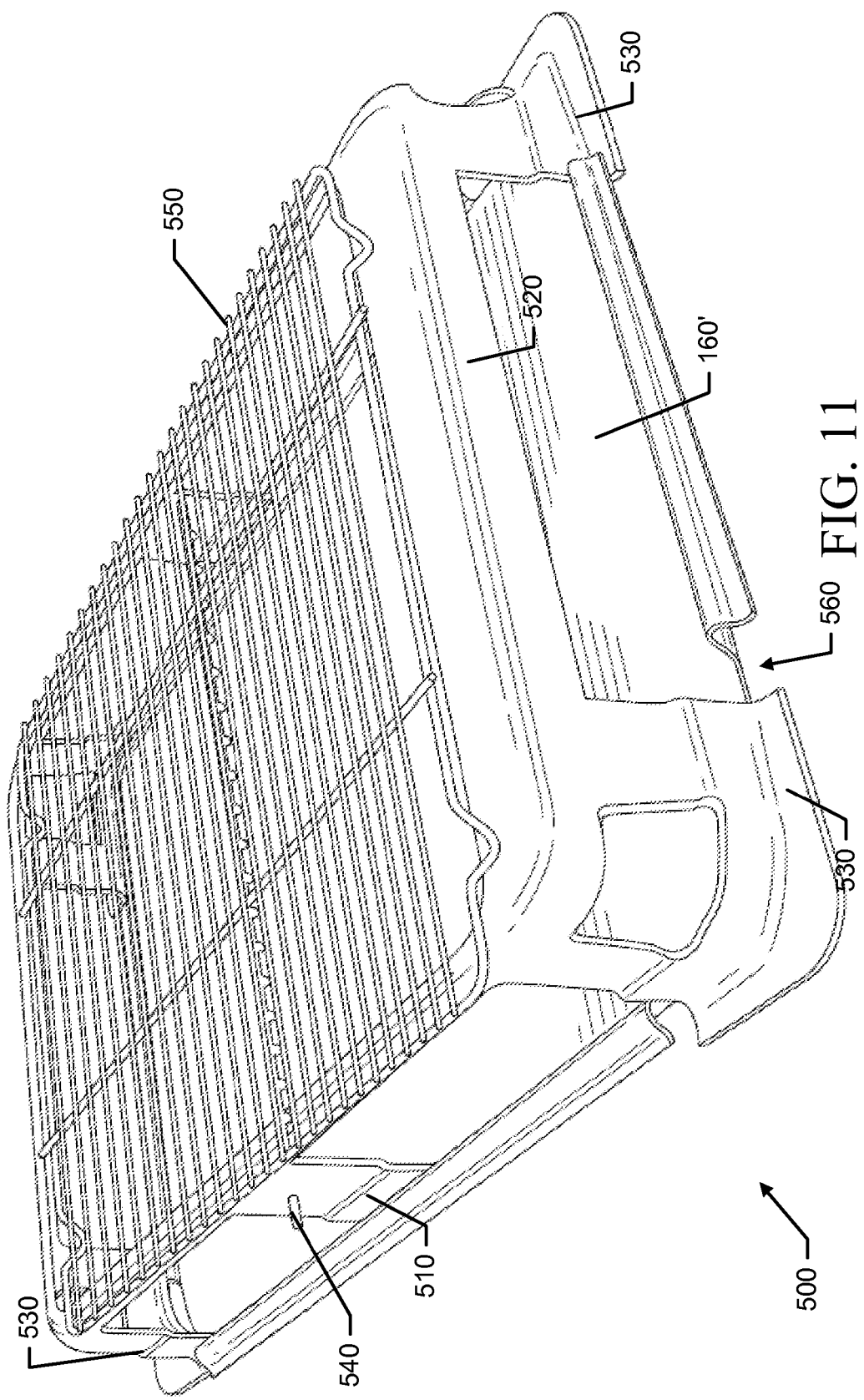
Figure 12:
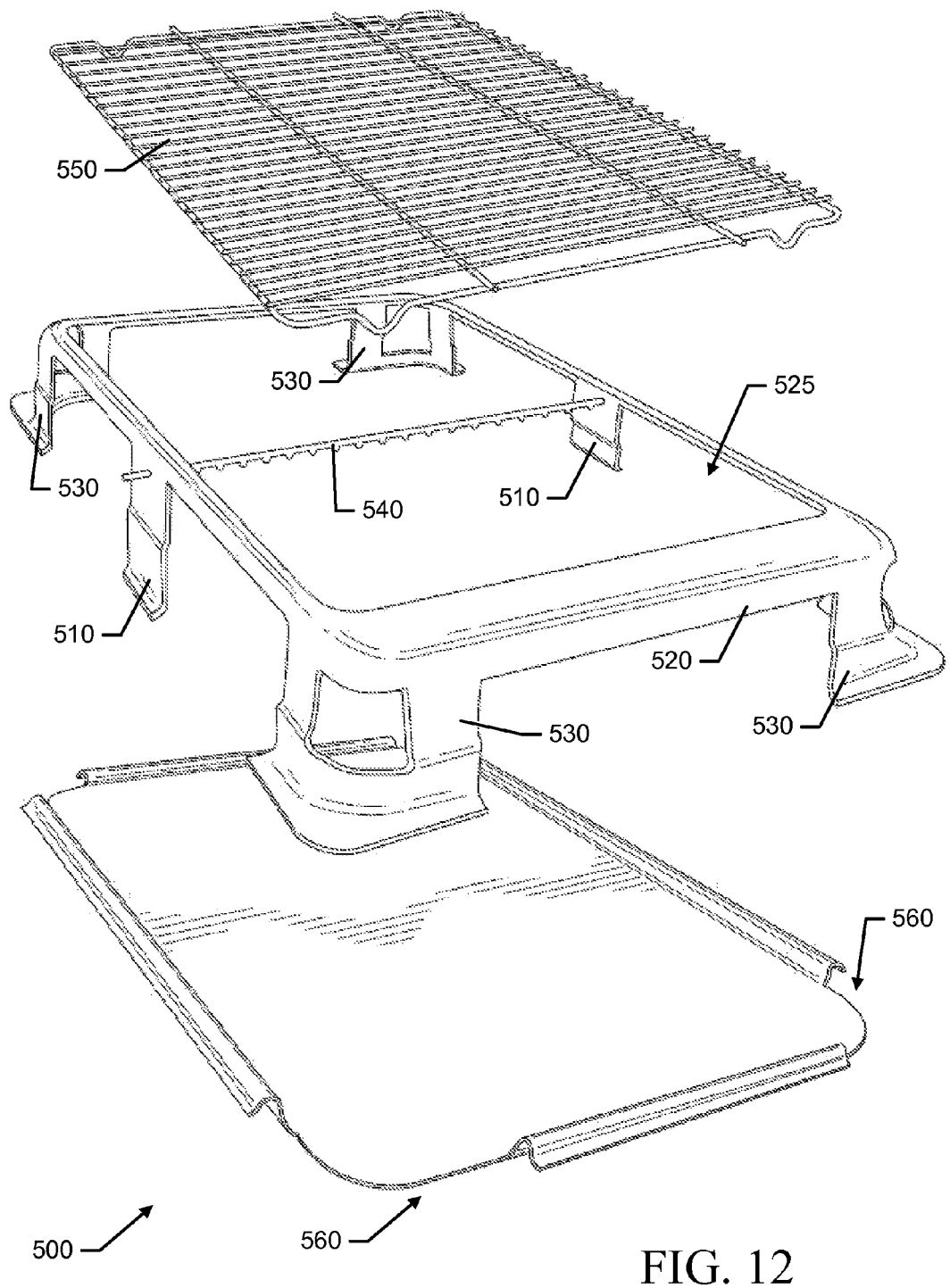

FIG. 7, which includes FIGS. 7A and 7B, illustrates a cookware appliance that may be used in connection with the oven of FIG. 1 according to an example embodiment;

FIG. 8 illustrates a top view of the bottom tier of the cookware appliance according to an example embodiment;

FIG. 9 illustrates a top view of the top tier according to an example embodiment FIG. 10 illustrates a perspective view of the cookware appliance of FIG. 7 disposed in the oven of FIG. 1;

FIG. 11 illustrates a perspective view of an alternative cookware appliance structure according to an example embodiment; and FIG. 12 illustrates an exploded perspective view of the components of the cookware appliance of FIG. 11 according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, since some example embodiments may provide the operator with increased flexibility and versatility relative to food item positioning, the operator may take better advantage of the characteristics of the oven. As an example, the operator may place food items so that RF cooking and browning characteristics may be utilized to place items more or less within the airflow path of the heated airstream that is used for product browning by controlling food product elevation. Alternatively or additionally, elevation or positioning of food product within the oven may avoid having one item block energy from being communicated to another item. Further still, elevation or positioning of food products may alter the RF cross section of certain items. Thus, in some cases, a better cooked product may be achieved in terms of consistent heating and browning by providing an ability to disperse food items over elevated cooking platforms within the oven.

FIG. 1 illustrates a perspective view of an oven 10 according to an example embodiment. As shown in FIG. 1, the oven 10 may include a cooking chamber 12 into which a food product may be placed for the application of heat by any of at least two energy sources that may be employed by the oven 10. The cooking chamber 12 may include a door 14 and an interface panel 16, which may sit proximate to the door 14 when the door 14 is closed. In an example embodiment, the interface panel 16 may include a touch screen display capable of providing visual indications to an operator and further capable of receiving touch inputs from the operator. The interface panel 16 may be the mechanism by which instructions are provided to the operator, and the mechanism by which feedback is provided to the operator regarding cooking process status, options and/or the like.

In some embodiments, the oven 10 may include multiple racks or may include rack (or pan) supports 18 or guide slots in order to facilitate the insertion of one or more racks or pans holding food product that is to be cooked. In an example embodiment, airflow slots 19 may be positioned proximate to the rack supports 18 (e.g., above the rack supports in one embodiment) to enable air to be forced over a surface of food product placed in a pan or rack associated with the corresponding rack supports 18. Food product placed on any one of the racks (or simply on a base of the cooking chamber 12 in embodiments where multiple racks are not employed) may be heated at least partially using radio frequency (RF) energy. Meanwhile, the airflow that may be provided may be heated to enable browning to be accomplished.

Figure 2:
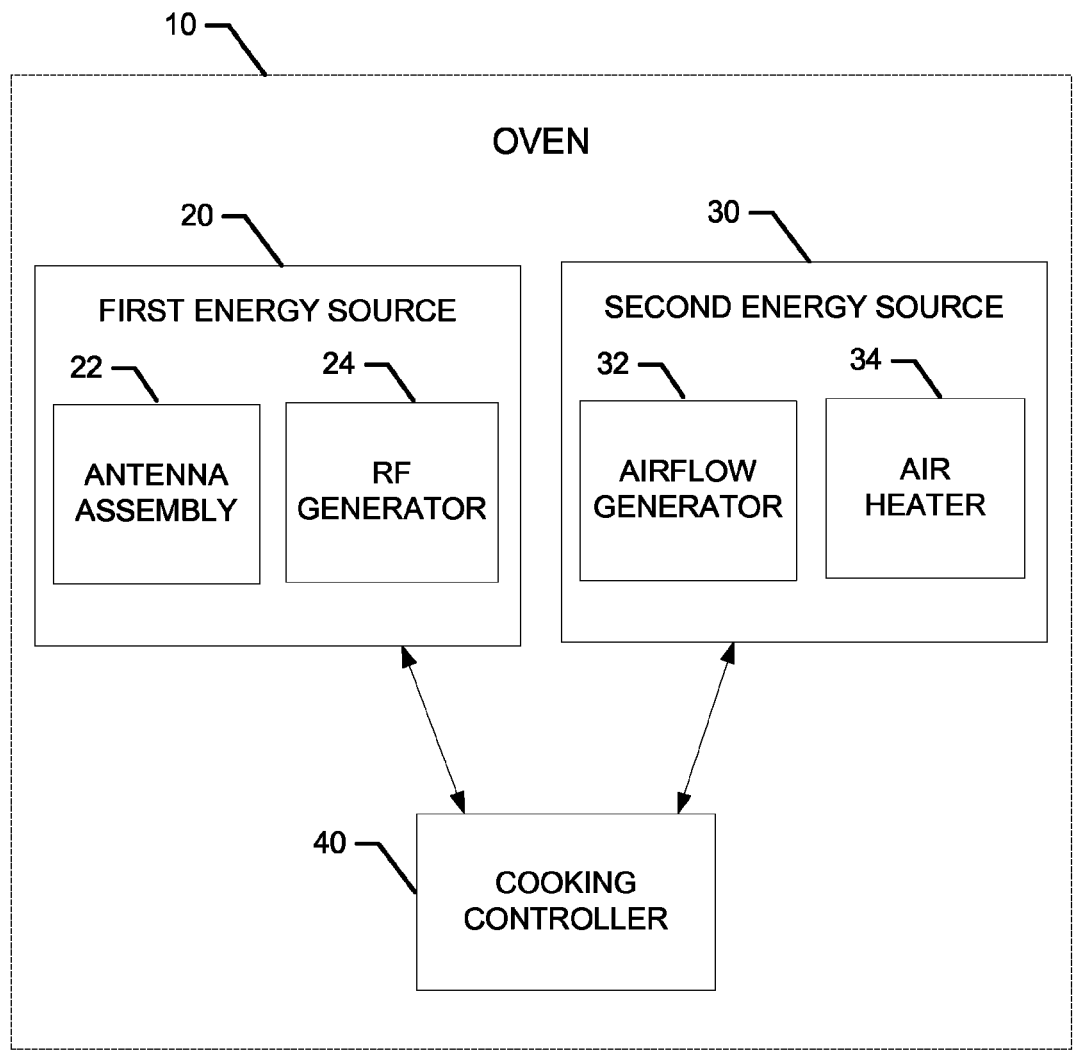
FIG. 2 illustrates a functional block diagram of the oven of FIG. 1 according to an example embodiment.

FIG. 2 illustrates a functional block diagram of the oven 10 according to an example embodiment. As shown in FIG. 2, the oven 10 may include at least a first energy source 20 and a second energy source 30. The first and second energy sources 20 and 30 may each correspond to respective different cooking methods. However, it should be appreciated that additional energy sources may also be provided in some embodiments.

In an example embodiment, the first energy source 20 may be an RF energy source configured to generate relatively broad spectrum RF energy to cook food product placed in the cooking chamber 12 of the oven 10. Thus, for example, the first energy source 20 may include an antenna assembly 22 and an RF generator 24. The RF generator 24 of one example embodiment may be configured to generate RF energy at selected levels over a range of 800 MHz to 1 GHz. The antenna assembly 22 may be configured to transmit the RF energy into the cooking chamber 12 and receive feedback to indicate absorption levels of respective different frequencies in the food product. The absorption levels may then be used, at least in part, to control the generation of RF energy to provide balanced cooking of the food product.

In some example embodiments, the second energy source 30 may be an energy source capable of inducing browning of the food product. Thus, for example, the second energy source 30 may include an airflow generator 32 and an air heater 34. However, in some cases, the second energy source 30 may be an infrared energy source, or some other energy source. In examples where the second energy source 30 includes the airflow generator 32, the airflow generator 32 may include a fan or other device capable of driving airflow through the cooking chamber 12 and over a surface of the food product (e.g., via the airflow slots). The air heater 34 may be an electrical heating element or other type of heater that heats air to be driven over the surface of the food product by the airflow generator 32. Both the temperature of the air and the speed of airflow will impact browning times that are achieved using the second energy source 30.

In an example embodiment, the first and second energy sources 20 and 30 may be controlled, either directly or indirectly, by a cooking controller 40. Moreover, it should be appreciated that either or both of the first and second energy sources 20 and 30 may be operated responsive to settings or control inputs that may be provided at the beginning, during or at the end of a program cooking cycle. Furthermore, energy delivered via either or both of the first and second energy sources 20 and 30 may be displayable via operation of the cooking controller 40. The cooking controller 40 may be configured to receive inputs descriptive of the food product and/or cooking conditions in order to provide instructions or controls to the first and second energy sources 20 and 30 to control the cooking process. The first energy source 20 may be said to provide primary heating of the food product, while the second energy source 30 provides secondary heating of the food product. However, it should be appreciated that the terms primary and secondary in this context do not necessarily provide any indication of the relative amounts of energy added by each source. Thus, for example, the secondary heating provided by the second energy source 30 may represent a larger total amount of energy than the primary heating provided by the first energy source 20. Thus, the term "primary" may indicate a temporal relationship and/or may be indicative of the fact that the first energy source is an energy source that can be directly measured, monitored and displayed. In some embodiments, the cooking controller 40 may be configured to receive both static and dynamic inputs regarding the food product and/or cooking conditions. Dynamic inputs may include feedback data regarding absorption of RF spectrum, as described above. In some cases, dynamic inputs may include adjustments made by the operator during the cooking process (e.g., to control the first energy source 20 or the second energy source 30), or changing (or changeable) cooking parameters that may be measured via a sensor network. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), and/or the like.

In some embodiments, the cooking controller 40 may be configured to access data tables that define RF cooking parameters used to drive the RF generator 34 to generate RF energy at corresponding levels and/or frequencies for corresponding times determined by the data tables based on initial condition information descriptive of the food product. As such, the cooking controller 40 may be configured to employ RF cooking as a primary energy source for cooking the food product. However, other energy sources (e.g., secondary and tertiary or other energy sources) may also be employed in the cooking process. In some cases, programs or recipes may be provided to define the cooking parameters to be employed for each of multiple potential cooking stages that may be defined for the food product and the cooking controller 40 may be configured to access and/or execute the programs or recipes. In some embodiments, the cooking controller 40 may be configured to determine which program to execute based on inputs provided by the user. In an example embodiment, an input to the cooking controller 40 may also include browning instructions or other instructions that relate to the application of energy from a secondary energy source (e.g., the second energy source 30). In this regard, for example, the browning instructions may include instructions regarding the air speed, air temperature and/or time of application of a set air speed and temperature combination. The browning instructions may be provided via a user interface as described in greater detail below, or may be provided via instructions associated with a program or recipe. Furthermore, in some cases, initial browning instructions may be provided via a program or recipe, and the operator may make adjustments to the energy added by the second energy source 30 in order to adjust the amount of browning to be applied. In such a case, an example embodiment may employ the cooking controller 40 to account for changes made to the amount of energy to be added by the second energy source 30, by adjusting the amount of energy to be added via the first energy source 20.

Figure 3:
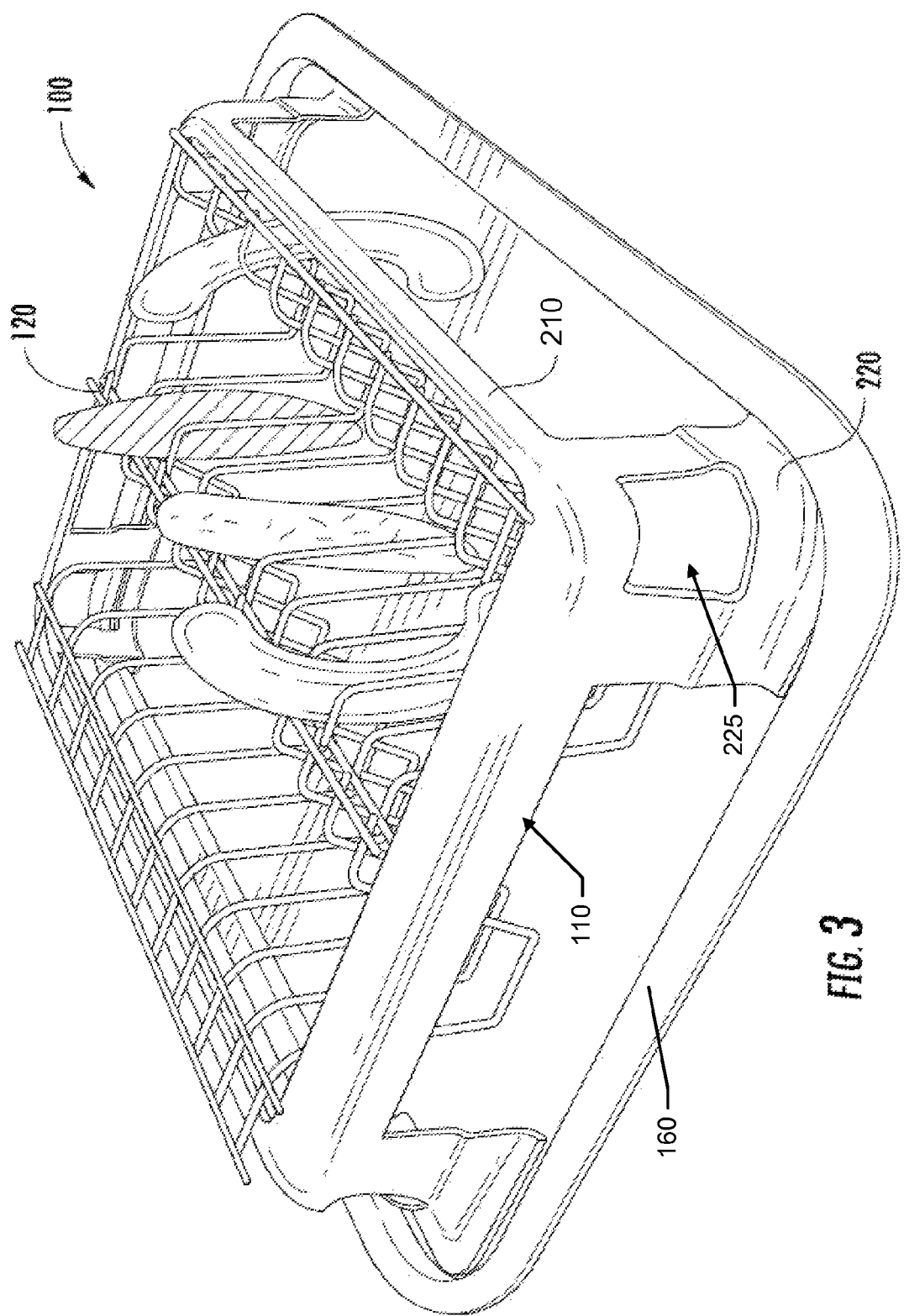
FIG. 3 illustrates a cookware appliance that may be used in connection with the oven of FIG. 1 according to an example embodiment.
Figure 4:
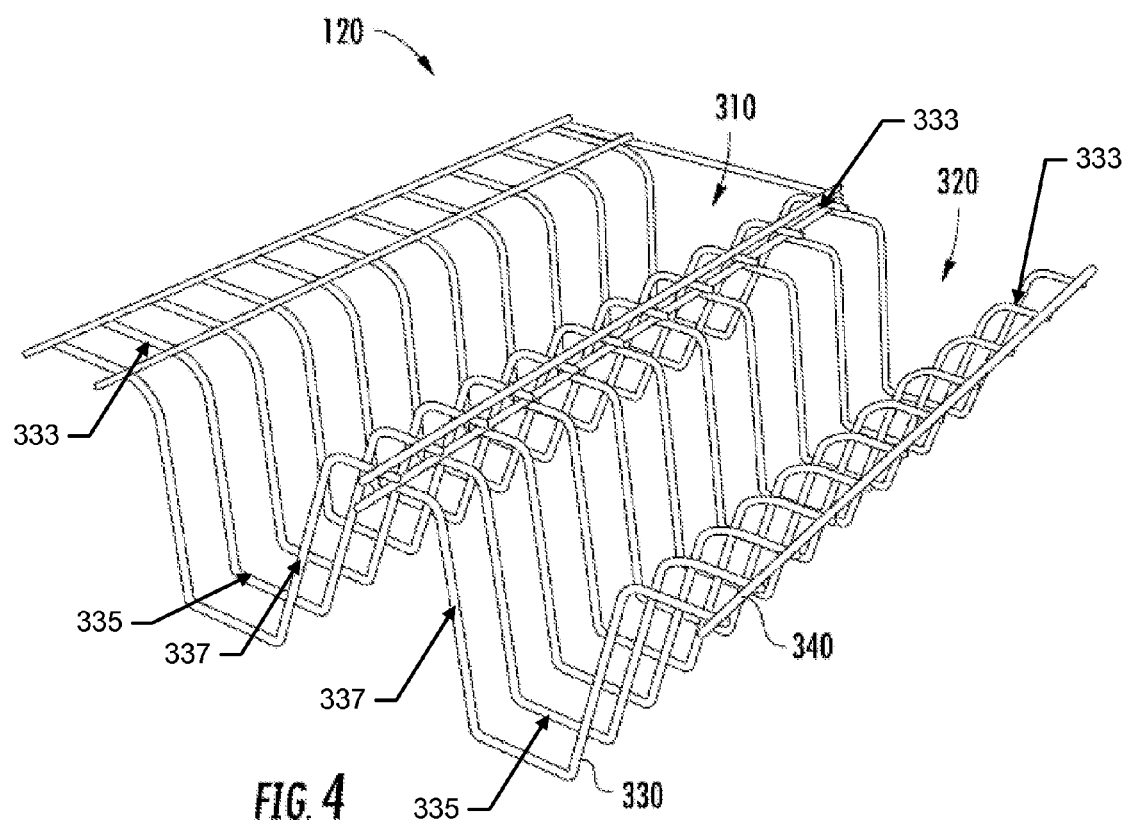
FIG. 4 illustrates an insert portion of the cookware appliance according to an example embodiment.
Figure 5:
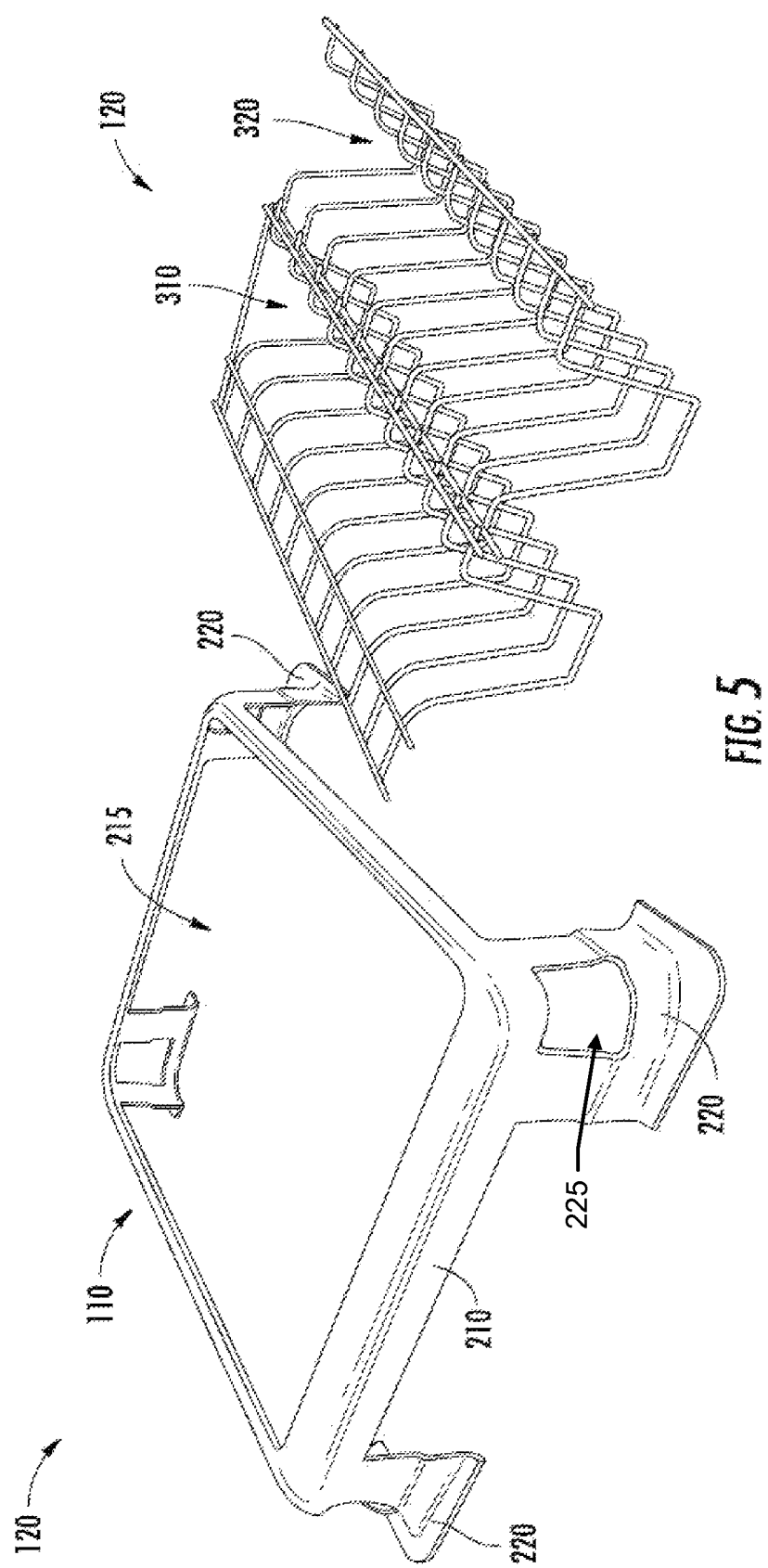
FIG. 5 illustrates a perspective view of the insert portion adjacent to an elevated platform for supporting the insert portion according to an example embodiment.
Figure 6:
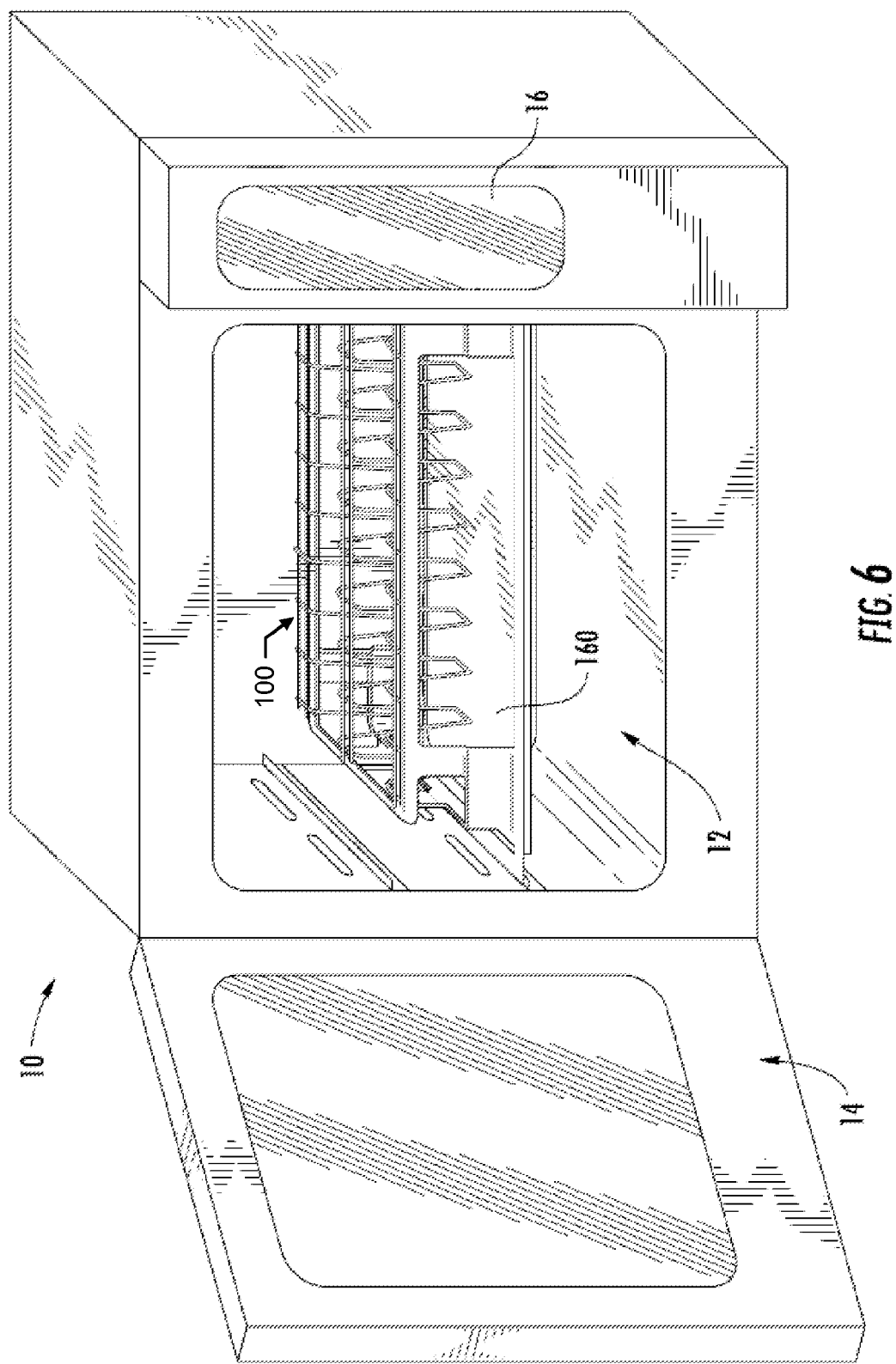
FIG. 6 illustrates a perspective view of the cooking appliance within the oven of FIG. 1 according to an example embodiment.

FIG. 3 illustrates a cookware appliance that may be used in connection with the oven 10 of FIG. 1 according to an example embodiment. However, it should be appreciated that the cookware appliance may also be useable in connection with some other ovens by virtue of its removable nature. The cookware appliance of FIG. 3 is embodied as multi-row elevation platform 100. Although FIG. 3 shows the multi-row elevation platform 100 having two rows, some embodiments may include more than just two rows. FIG. 4 illustrates an insert portion of the cookware appliance and FIG. 5 illustrates a perspective view of the insert portion adjacent to an elevated platform for supporting the insert portion according to an example embodiment. FIG. 6 illustrates a perspective view of the cooking appliance within the oven of FIG. 1. An example embodiment will now be described in reference to FIGS. 3 to 6.

As shown in FIG. 3, the multi-row elevation platform 100 may include an elevated platform 110 and an insert portion 120. In an example embodiment, the elevated platform 110 may be substantially rectangular in shape to substantially match a shape of the cooking chamber 12. However, any shape may be employed as long as the elevated platform 110 is enabled to fit within the cooking chamber 12.

The elevated platform 110 may include a frame that may be made of a high temperature amber plastic, or other material that is substantially invisible to RF energy. In other words, the elevated platform 110 may be formed from a material that does not substantially absorb or reflect RF energy. Thus a material that is "substantially invisible to RF energy" may be any material that is transparent to RF or does not substantially absorb or reflect RF energy. For example, Polyether ether ketone (PEEK) is one example of a thermoplastic polymer that may be useful as a material for forming the elevated platform 110. Other potentially useful materials may include ceramics, glass or other polymer that is substantially invisible to RF energy. The frame may include a periphery 210 that includes four sides defining a rectangular shaped receiving opening 215. The frame may further include legs 220 at each of the respective four corners of the frame where each of the four sides meets its adjacent sides. In an example embodiment, the legs 220 may be positioned such that one leg is proximate to each of the four corners of the periphery 210. In an example embodiment the legs 220 may be arranged such that at least a portion thereof extends around each face forming a corner in the frame. The legs 220 may extend downward to support the periphery 210 to elevate the periphery 210 relative to a structure on which the elevated platform 110 rests. In some embodiments, the legs 220 may include a cutout portion 225 disposed at the corner portion of the legs 220. The cutout portion 225, and the fact that a profile of the periphery 210 and the legs 220 is relatively small, may enable airflow to pass across the multi-row elevation platform 100 to facilitate cooking and/or browning of food placed in the insert portion 120. In some embodiments, the legs 220 and the frame (or periphery 210) of the elevated platform 110 may be formed as a single unitary structure.

In an example embodiment, a cooking tray, pan, grate or other structure may be slid into the rack supports 18 of FIG. 1 as is shown in FIG. 6 relative to placement on a pan 160. The legs 220 may then rest on the tray, pan, grate or other such structure. In an example embodiment, the legs 220 may be substantially elongated L-shaped structures that extend downward away from the periphery 210 to engage and extend or elevate the elevated platform 110 above the structure on which the elevated platform 110 rests. A top portion of the frame (e.g., the periphery 210) may lie in a plane that is substantially parallel to a plane in which the pan 160 lies.

In the example of FIG. 5, the receiving opening 215 is shown with the insert portion 120 removed. The insert portion 120 may be a stainless steel, aluminum or other metallic structure configured to support food product, but allow heat and/or airflow to pass through the insert portion 120. In some cases, the insert portion 120 may be supported within the receiving opening 215 via clamps, extended support tabs or other structures. However, in some cases, the insert portion 120 may include bars, wires, elongate members, mesh structures and/or the like that traverse the receiving opening 215 to be supported by resting on the periphery 210.

Although the legs 220 of one example embodiment are provided such that they rest on a tray, pan, grate or other such structure, in some embodiments, the legs 220 may be designed to extend at least slightly outward and have a size sufficient to enable them to be slid into the rack supports 18. In such an example, the elevated platform 110 may be supported entirely by the rack supports 18.

The insert portion 120 of one embodiment may include at least two rows (e.g., a first row 310 and a second row 320) formed in a mesh structure of bent elongate members (e.g., wires, bars and/or the like) such that each of the two rows has at least a slightly different elevation or same elevation. Furthermore, in some embodiments, each of the two rows may have at least a slightly different orientation or a same orientation. For example, in some cases, the bends formed in the horizontally extending members 330 of the first row 310 may not be as severe as the bends formed in the horizontally extending members of the second row 320. This may allow containers or food products to be placed into the first row 310 at a different elevation and/or orientation than containers or food products placed into the second row 320. In some embodiments, the first row 310 and the second row 320 may substantially mirror each other such that both rows enable food placement at the same elevation and orientation. Longitudinally extending members 340 may not include any bends in one example embodiment, but may instead all be disposed at substantially the same elevation (e.g., in the same plane) and may at least in part support the insert portion 120 in engagement with the elevated platform 110.

The insert portion 120 may include a first food holding location 333 and a second food holding location 335. The first and second food holding locations 333 and 335 may each be disposed at different elevations. For example, the first food holding location 333 may be disposed to lie in a plane that is parallel and proximate to the plane in which the top portion of the frame (e.g., the periphery 210) lies. Meanwhile, the second food holding location 335, which in this example is defined at a bottom portion (or lowest elevation) of the first and second rows 310 and 320. The second food holding location 335 lies in a plane that is parallel to the plane in which the first food holding location 333 lies, but at a lower elevation. In this embodiment, sidewalls 337 extend between the first and second food holding locations 333 and 335. Food may therefore be supported at the second food holding location 335 and extend along one of the sidewalls 337 to be held in a non-horizontal orientation. As such, some food items may be held in a horizontal orientation at one or the other, or both, of the first food holding location 333 and the second food holding location 335, while still other food items could be held in a non-horizontal orientation extending along one of the sidewalls 337.

Accordingly, in an example embodiment similar to the one shown in FIG. 3, food items may be supported within at least one of the rows such that the food items are oriented substantially vertically (or at least non-horizontally). This may be useful for food items that are relatively long in at least one dimension and relatively thin in at least on other dimension. For example, a rack of ribs or sausages may benefit from being supported at one point by a lowest point in one of the rows (e.g., the second food holding location 335) and leaning up against at least one of the sidewalls 337 of the corresponding row. In this regard, in some cases the food items may be disposed such that a portion of the food item rests in a base portion or lowest elevation portion of one of the rows (e.g., the second food holding location 335), while the food item extends up the wires or bars of the sidewalls 337 forming the corresponding row (which wires or bars may or may not be provided at an angle or slope other than vertical) in order to place the food item substantially longitudinally erect within the row as is shown in FIG. 3. In some embodiments, rather than resting on the lowest elevation portion of one of the rows, the food item may actually rest on the pan 160 and extend through the wires or bars forming the insert portion 120. However, regardless of whether the insert portion 120 carries the entire weight of the food item (e.g., when the food item rests on the lowest elevation portion and extends up a sidewall of a row), or whether the insert portion 120 merely provides for holding the food item in a substantially longitudinally erect position, the insert portion 120 may provide the operator with options for placement of the food items in a manner that tends to increase the cross section of the food item relative to the RF energy applied in the oven 10 and airflow in the oven 10, while at the same time also elevating the food item (or a portion thereof).

In some embodiments, the insert portion 120 may be formed of a metallic material, which may block RF energy. Of course, the bars, wires or other elongate members of the insert portion 120 may also block air flow. Thus, forming the insert portion 120 with relatively widely spaced apart, and relatively thin, metallic members may substantially reduce or minimize the blocking effect of the RF energy and/or the airflow relative to any food items disposed in the insert portion 120. Meanwhile, the elevated platform 110 may be made from a material that is substantially invisible to RF energy so that the elevated platform 110 does not in any way inhibit the cooking processes that are accomplished via RF energy. Given that the elevated platform needs to be more robust to carry the weight of all or any food items disposed on the multi-row elevation platform 100, the elevated platform 110 may be made of material that is invisible to RF and also have cutout sides (and perhaps also corners) to further reduce any impacts the elevated platform 110 may have on airflow. Thus, example embodiments may provide an elevated platform that is substantially invisible to RF that supports an insertable appliance that is metallic, where the insertable appliance is configured to enable the placement of at least one food item elevated relative to a base of the elevated platform, and in an orientation that is substantially vertical or at least in an orientation that is substantially out of the horizontal plane. In some embodiments, the orientation that is substantially out of the horizontal plane may be any angle that is greater than 45 degrees from the horizontal plane.

Although FIGS. 3-6 illustrate one example of an insert portion 120 that may be used to elevate a food item, or at least elevate a portion of the food item, in order to increase the RF exposure to the food item (and perhaps also increase exposure of the food item to air flow), it should be appreciated that other possible inserts may be used as alternatives. In this regard, for example, although the insert portion 120 of FIGS. 3-6 includes rack portions having at least two different elevation levels provided with the same assembly piece (i.e., the insert portion 120), other inserts or assembly pieces may be employed to achieve multiple elevation levels with separate assembly pieces. For example, at least two level elevation options may be provided using at least two separate assembly pieces as shown in the examples of FIGS. 7-12.

FIG. 7, which includes FIGS. 7A and 7B, illustrates a cookware appliance that may be used in connection with the oven of FIG. 1 according to an example embodiment. In this regard, FIG. 7A illustrates the cookware appliance in a stacked configuration, while FIG. 7B shows the same cookware appliance with the top tier and bottom tier separated from each other. However, it should be appreciated that the cookware appliance may also be useable in connection with some other ovens by virtue of its removable nature. The cookware appliance of FIG. 7 is embodied as a multiple-tier baking shelf 400. Although FIG. 7 shows the multiple-tier baking shelf 400 having two tiers, some embodiments may include more than just two tiers. FIG. 8 illustrates a top view of the bottom tier of the cookware appliance according to an example embodiment. FIG. 9 illustrates a top view of the top tier of the cookware appliance. FIG. 10 illustrates a perspective view of the cookware appliance of FIG. 7 disposed in the oven of FIG. 1. FIG. 11 illustrates a perspective view of an alternative cookware appliance structure according to an example embodiment, and FIG. 12 illustrates an exploded perspective view of the components of the cookware appliance of FIG. 11 according to an example embodiment. Some example embodiments will now be described in reference to FIGS. 7 to 12.

As shown in FIG. 7, the multiple-tier baking shelf 400 may include a bottom tier 410 and a top tier 420. However, as indicated above, intermediate tiers between the bottom tier 410 and the top tier 420 may be included in some cases. In an example embodiment, the bottom tier 410 and the top tier 420 may each be substantially rectangular in shape to substantially match a shape of the cooking chamber 12. However, any shape may be employed as long as the bottom tier 410 and the top tier 420 fit within the cooking chamber 12.

In some embodiments, the bottom tier 410 and the top tier 420 may each have substantially the same shape and dimensions. However, as indicated by FIG. 7A, in some cases, the top tier 420 may be slightly larger than the bottom tier 410 so that the bottom tier 410 fits entirely underneath and within the structure of the top tier 420. As such, the bottom tier 410 may be separable from the top tier 420 and either the top tier 420 or the bottom tier 410 may be useable independently of one another. The top tier 420 of this example may form a first food holding location, and the bottom tier 410 of this example may form a second food holding location that may function similarly to the first and second food holding locations 333 and 335 described above. However, unlike the first and second food holding locations 333 and 335 described above, the top tier 420 and bottom tier 410 of this example are not connected by any sidewalls. However, the top tier 420 and bottom tier 410 still provide an opportunity for holding food items using structures disposed in two parallel planes defining potentially separate food holding locations. Thus, food items may be disposed horizontally on either food holding location (e.g., either the top tier 420 or the bottom tier 410) and/or may be disposed non-horizontally to be supported at least in part by each of the two tiers in a manner that provides the food items with an increases RF cross section and also increased exposure to airflow.

In the example of FIGS. 7 and 8, the bottom tier 410 includes a frame 430 that extends around a periphery of the bottom tier 410. The frame 430 includes a first frame member 432, a second frame member 434, a third frame member 436 and a fourth frame member 438. The first frame member 432 extends substantially perpendicular to the second and fourth frame members 434 and 438, which each connect to an opposite end of the first frame member 432. The first frame member 432 also extends substantially parallel to the third frame member 436. The third frame member 436 extends between the opposite ends of the second and fourth frame members 434 and 438 relative to the ends of the second and fourth frame members 434 and 438 that connect to the first frame member 432. The second and fourth frame members 434 and 438 also extend substantially perpendicular to the third frame member 436.

The bottom tier 410 further includes a grate structure 440 that is disposed to lie in the same plane as the frame 430 and cover an entirety of the area defined by the frame 430. The grate structure 440 of FIG. 8 is formed as a wire mesh that includes members that extend diagonally relative to the frame members. However, in some embodiments, the grate structure 440 may include wires, bars, or other members that extend substantially parallel (or perpendicular) to the first and third frame members 432 and 436 and substantially perpendicular (or parallel) to the second and fourth frame members 434 and 438. The grate structure 440 may be affixed to the frame members by welding, by being pinched between portions of the frame members, or by another form of adhesion. Alternatively, the grate structure 440 may be removable from the frame 430 and may rest upon the frame 430. The bottom tier 410 may be structured in similar fashion to the structure described above for the top tier 420, so a specific description of the structure of the bottom tier 410 would be redundant and will not be provided herein.

In some embodiments, the bottom tier 410 may include support feet 450 that may be positioned proximate to corners of the frame members and extend downward. The support feet 450 may support the bottom tier 410 to elevate the bottom tier 410 relative to a structure on which the bottom tier 410 rests (e.g., pan 160). In an example embodiment, a cooking tray, pan, grate or other structure may be slid into the rack supports 18 of FIG. 1. The support feet 450 may then rest on the tray, pan, grate or other such structure. In an example embodiment, the support feet 450 may be substantially C-shaped or U-shaped structures that are attached to frame members on opposing sides. Alternatively, the support feet 450 may simply be bent or extended pieces of metal affixed to the frame 430 to contact the structure on which the bottom tier 410 rests in order to extend or elevate the bottom tier 410 above the structure on which the bottom tier 410 rests. Moreover, as indicated above, the bottom tier 410 may fit beneath and entirely within the structure defined by the top tier 420. In some embodiments, the bottom tier 410 may be made from a rigid material such as stainless steel, aluminum or other metals that block RF energy. However, other materials may also be employed such as heat resistant plastics.

The top tier 420 may fit within or otherwise be supported by the receiving opening 215. As such, the top tier 420 may be supported by the same elevated platform 110 described above in connection with the embodiment of FIGS. 3-6. In an example embodiment the legs 220 of the elevated platform 110 may be arranged such that when the top tier 420 is disposed over the bottom tier 410, the frame members of the bottom tier 410 fit entirely between the legs 220. Thus, for example, each of the legs 220 may each include at least a portion that extends around each face forming a corner in the frame 430 of the bottom tier 410. The legs 220 may be supported by the same structure that supports the support feet 450 of the bottom tier 410 (e.g., pan 160).

In the example of FIG. 9, the receiving opening 215 is shown with a cooking grate 250 supported therein. The cooking grate 250 may be a stainless steel, aluminum or other metallic structure configured to support food product, but allow heat and/or airflow to pass through it. In some cases, the cooking grate 250 may be supported within the receiving opening 215 via clamps, extended support tabs or other structures. However, in some cases, the cooking grate 250 may include bars, wires, elongate members, mesh structures and/or the like that traverse the receiving opening 215 to be supported by resting on the periphery 210.

In an example embodiment, the frame members, the grate structure, the support brackets and/or the support feet of the multiple-tier baking shelf 400 may be made from aluminum. However, alternative materials may be used in other embodiments, such as, for example, stainless steel.

Although the legs 220 and the support feet 450 of one example embodiment are provided such that they rest on a tray, pan, grate or other such base structure, in some embodiments, the legs and support feet 150 may be designed to extend at least slightly outward and have a size sufficient to enable them to be slid into the rack supports 18. In such an example, the bottom tier 410 may still fit entirely beneath the top tier 420 and the legs 220 may extend around portions of the bottom tier 410. However, each one of the support feet 450 may be positioned proximate to a corresponding one of the legs 220, but inside of the corners of the periphery 210 at a portion of the legs 220 that is adjacent to the rack supports 18. As such, the bottom tier 410 may form an elevated under-mesh beneath the top tier 420. Moreover, example embodiments may provide a plastic support structure forming a base for the top tier 420, with the under-mesh being a metallic shelf disposed to provide a second elevated surface that is at a different elevation than the other elevated surface. Accordingly, the example embodiment of FIGS. 7-10 may also be employed to provide for elevation of a food item, or at least elevation of a portion of the food item, in order to increase the RF exposure to the food item (and perhaps also increase exposure of the food item to air flow) using a base structure that is substantially invisible to RF energy to elevate a metallic insert (e.g., a grate or other support structure) that supports a food item. The metallic insert in this example includes two separate pieces (e.g., the top tier 420 and the bottom tier 410)

that could be provided as examples of a possibly interchangeable inserts that may be employed in connection with the elevated platform 110. In this regard, for example, although the insert portion 120 of FIGS. 3-6 includes rack portions having at least two different elevation levels provided with the same assembly piece (i.e., the insert portion 120), the examples of FIGS. 7-10 provide the at least two different elevation levels with two separately provided insert portions. In this case, both of the separately provided insert portions are elevated with respect to the structure on which the cookware appliance is supported (e.g., pan 160). However, in another example embodiment, the lower tier could be the pan itself, or a modified version of the pan to support fitting of the edges of the modified pan together with the corners of the elevated platform 110 as shown in FIGS. 11 and 12.

FIG. 11 shows a perspective view of an alternative cookware appliance structure in which a modified pan 160' forms a second tier of the cookware appliance according to an example embodiment. FIG. 12 shows an exploded perspective view of the cookware appliance 500 of FIG. 11. The embodiment of FIGS. 11 and 12 may be practiced in connection with the same elevated platform 110 shown in FIGS. 3-6 and 7-10. However, in some embodiments, the elevated platform may be slightly modified. For example, in FIGS. 11 and 12, an elevated platform 110' is provided that is similar to the elevated platform 110 of preceding embodiments except that the elevated platform 110' includes additional support structures 510 that may be positioned substantially in a middle portion of one of opposing sides of the periphery 520 between legs 530 that may otherwise be similar to the legs 220 described above. The periphery 520 may form a receiving opening 525, as described above.

In an example embodiment, the additional support structures 510 may support a cross bar 540 that may support additional weight of the metallic grate 550 forming the top tier of the cookware appliance 500. The support structures 510 may sit on the pan 160' and be supported by the pan 160'. Meanwhile, as indicated above, the pan 160' may form the bottom tier of the cookware appliance 500. The pan 160' may be notched at respective corners thereof in order to enable the legs 530 to fit within notched portions 560 of the pan 160'.

As can be appreciated from the description above, the elevated platform 110 may be a standard piece of equipment that may be interchangeably used with a plurality of different removable inserts. As such, for example, the elevated platform 110 may form an oven accessory that may be provided with removable and interchangeable inserts (e.g., the insert portion 120, the metallic grates, and/or the corresponding second tier components described above). The oven accessory may include a frame structure formed of a material that is substantially invisible to RF energy and a plurality of removable inserts made of metallic material. The frame structure may include legs and a periphery supported by the legs to be elevated above a base (e.g., a baking pan) disposed within an oven. The periphery may define a receiving opening and lie in a first plane that is spaced apart from and substantially parallel to a second plane in which the base lies. The plurality of removable inserts may each be made of metallic material and at least some of them may be configured to be interchangeably disposed at the receiving opening independently of each other. At least one of the removable inserts may be configured to define at least one elevated food holding location disposed at or above the first plane to combine with at least one other food holding location provided by a same or other removable insert to enable support of a food product in a substantially vertical orientation.

In some embodiments, cooking using any of the elevated structures described herein may be enhanced by employing at least one pan beneath the elevated structure. The pan (e.g., pan 160) may not only suspend the food to place it in a better position for reception of airflow and RF energy, but the pan may also reflect or focus RF energy and/or airflow upward toward the food placed on the elevated structure. Moreover, in some cases, placing a pan above the elevated structure may further enhance cooking characteristics achieved. The provision of multiple elevated tiers or food holding locations may increase productivity and/or efficiency, by allowing a plurality of food items to be cooked simultaneously. Moreover, the fact that different orientations may be achieved, including vertical or at least non-horizontal orientations, may also allow increased exposure to airflow and RF penetration so that a more consistent product may be achieved.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven accessory for elevating food product to be cooked in an oven, the oven accessory comprising:
   a frame structure formed of a material that is substantially invisible to radio frequency (RF) energy, the frame structure including legs and a periphery supported by the legs to be elevated above a base disposed within the oven, the periphery defining a receiving opening and lying in a first plane that is spaced apart from and substantially parallel to a second plane in which the base lies; and
   a plurality of removable inserts, at least some of the removable inserts being configured to be interchangeably disposed at the receiving opening independently of each other, at least one of the removable inserts being configured to define at least one elevated food holding location disposed at or above the first plane to combine with at least one other food holding location provided by a same or other removable insert to enable support of a food product in a substantially vertical orientation when disposed in the oven accessory,
   wherein one of the removable inserts includes a side wall defined between the at least one elevated food holding location and the at least one other food holding location, the sidewall configured to facilitate holding a food item in substantially a vertical orientation with a bottom portion of the food item supported by the at least one other food holding location, and wherein the one of the removable inserts includes at least two rows disposed substantially parallel to each other, wherein a top portion of each of the at least two rows is disposed at the at least one elevated food holding location, and wherein each of the at least two rows has a corresponding sidewall having different slopes extending down to a bottom portion of respective ones of the at least two rows.

2. The oven accessory of claim 1, wherein the at least one other food holding location is defined at a different plane lying parallel to the first plane and between the second plane and the first plane.

3. The oven accessory of claim 1, wherein one of the removable inserts includes at least two rows disposed substantially parallel to each other, and wherein a bottom portion of the at least two rows are disposed at different elevations.

4. The oven accessory of claim 1, wherein one of the removable inserts includes at least two rows disposed substantially parallel to each other, and wherein a bottom portion of each of the at least two rows is disposed at the at least one other food holding location, and a top portion of each of the at least two rows is disposed at the at least one elevated food holding location.

5. The oven accessory of claim 1, wherein the at least one elevated food holding location and the at least one other food holding location are configured to each support respective different portions of a food item such that the food item is held in a non-horizontal orientation to increase a cross section of the food item relative to the RF energy applied in the oven and airflow in the oven.

6. The oven accessory of claim 1, wherein one of the removable inserts includes a relatively flat cooking grate, and wherein the at least at least one other food holding location comprises a baking pan forming the base.

7. The oven accessory of claim 6, wherein the baking pan comprises notched corners, the notched corners shaped such that the legs fit into corresponding ones of the notched corners.

8. The oven accessory of claim 1, wherein the frame structure and the legs are integrally formed of high temperature amber plastic.

9. The oven accessory of claim 1, wherein the frame structure and the legs are integrally formed of Polyether ether ketone (PEEK).

10. The oven accessory of claim 1, wherein the legs each include a cutout portion to facilitate airflow through the legs.

11. The oven accessory of claim 1, wherein a single one of the removable inserts includes a first portion defining the elevated food holding location and a second portion defining the other food holding location.

12. The oven accessory of claim 1, wherein one of the removable inserts includes a portion defining the first elevated food holding location and another one of the removable inserts includes a portion defining the other food holding location.

13. The oven accessory of claim 1, wherein at least some of the removable inserts are made of metallic material.

14. An oven accessory for elevating food product to be cooked in an oven, the oven accessory comprising:
a frame structure formed of a material that is substantially invisible to radio frequency (RF) energy, the frame structure including legs and a periphery supported by the legs to be elevated above a base disposed within the oven, the periphery defining a receiving opening and lying in a first plane that is spaced apart from and substantially parallel to a second plane in which the base lies; and
a plurality of removable inserts, at least some of the removable inserts being configured to be interchangeably disposed at the receiving opening independently of each other, at least one of the removable inserts being configured to define at least one elevated food holding location disposed at or above the first plane to combine with at least one other food holding location provided by a same or other removable insert to enable support of a food product in a substantially vertical orientation when disposed in the oven accessory,
wherein one of the removable inserts includes a relatively flat cooking grate, and wherein another one of the removable inserts comprises a wire mesh insert disposed between the legs and supported via the base at the at least one other food holding location, and
wherein the wire mesh insert includes feet disposed proximate to respective corners thereof, the feet suspending the wire mesh insert relative to an elevation of a baking pan forming the base.

15. The oven accessory of claim 14, wherein the wire mesh insert fits entirely between the legs.

16. The oven accessory of claim 14, wherein the frame structure and the legs are integrally formed of high temperature amber plastic or are integrally formed of Polyether ether ketone (PEEK).

17. The oven accessory of claim 14, wherein the legs each include a cutout portion to facilitate airflow through the legs.

18. The oven accessory of claim 14, wherein a single one of the removable inserts includes a first portion defining the elevated food holding location and a second portion defining the other food holding location.

19. The oven accessory of claim 14, wherein one of the removable inserts includes a portion defining the first elevated food holding location and another one of the removable inserts includes a portion defining the other food holding location.

20. The oven accessory of claim 14, wherein at least some of the removable inserts are made of metallic material.

* * * * *